United States Patent Office

3,394,127
Patented July 23, 1968

3,394,127
DENSIFICATION OF CARBOXYMETHYL
CELLULOSE
Roy W. Sommers, Pennsville, N.J., assignor to E. I. du Pont de Nemours and Company, Wilmington, Del., a corporation of Delaware
No Drawing. Filed Sept. 30, 1964, Ser. No. 400,555
15 Claims. (Cl. 260—232)

This invention relates to a process for converting fibrous water-soluble carboxyalkyl cellulose ethers into a free-flowing granular powder form, and more particularly, to a process for making dense, granular carboxyalkyl cellulose ethers.

Water-soluble salts of carboxyalkyl cellulose in fibrous form, particularly sodium carboxymethyl cellulose (hereinafter referred to as CMC) are easily prepared by an etherification reaction between cellulose fibers, sodium hydroxide and a carboxyalkylating agent. The etherification reaction is conducted in the presence of an amount of aqueous alcohol such that upon completion of the reaction, the resulting cellulose ether is obtained as a mass of loose moist fibers having a fiber form similar to that of the starting cellulose. Following the etherification reaction the crude product may be either neutralized and dried directly, or it may be neutralized and then washed free of by-product salts with a suitable aqueous alcohol and then dried. In either case, the product retains substantially the same fibrous form of the starting cellulose through the subsequent processing steps.

A number of methods are known for converting fibrous forms of water-soluble cellulose ethers, including CMC, into free-flowing granular powders after they have had most of the liquid present during the etherification removed. Such processes are commonly referred to as deliquification procedures. Furthermore, it is known, for example, that a granular form of CMC can be prepared by the addition of limited amounts of water, after such deliquification, to convert the salt of CMC to an incipient gel form, followed by drying and comminution.

An object of this invention is to provide a process for making dense granular salts of carboxyalkyl cellulose. Another object of this invention is to provide a process for preparing dense granular carboxymethyl cellulose that is economical and can be readily incorporated in slurry processes for making carboxymethyl cellulose. These and other objects and advantages of the invention will become apparent from the following detailed description.

It has been discovered that a dense, granular carboxyalkyl cellulose either can be prepared in a 3-component, 2-phase liquid reaction medium provided that from about 0.1 to 3 parts water, and preferably 0.2 to 2 parts water, per part cellulose is added to the liquid reaction medium after substantial completion of the etherification reaction for a period of at least about 3 minutes. The water can be added to the reaction medium over an extended period of time and satisfactory results are produced. However, for practical reasons the amount of time during which the water is added is usually not greater than about 20 minutes, and preferably from 3 to 10 minutes. The resulting dense carboxyalkyl cellulose is recovered by conventional deliquifying procedures such as, for example, filtration, centrifugation or other conventional procedures.

The process of the present invention for making granular, dense alkali metal salts of carboxymethyl cellulose comprises preparing said alkali metal salts by the reaction of alkali cellulose with a carboxyalkylating agent. The reaction is carried out in a 3-component, 2-phase liquid reaction medium in which one liquid phase i.e., the aqueous phase, comprises a mixture of water and a water-miscible aliphatic alcohol, preferably having from 2 to 4 carbon atoms, and the second liquid phase, i.e., the organic phase, comprises an inert water-immiscible organic liquid hydrocarbon and an additonal amount of said water-miscible aliphatic alcohol. The ratio of total liquid by weight in said reaction medium to dry cellulose is at least about 4:1 and does not exceed about 20:1, the ratio of water by weight in the water-alcohol phase to dry cellulose at the beginning of the reaction is in the range of about 0.03:1 to about 3.4:1. The total amount of said water-miscible aliphatic alcohol in the reaction medium constitutes at least about 7% by weight of the total weight of the liquid in the reaction mixture at the start of the reaction. Then after substantial completion of the etherification reaction, it is necessary to add to the reaction medium from 0.1 to 3.0 parts of water per part of cellulose over a period of at least about 3 minutes. The alkali metal salt of carboxymethyl cellulose is deliquified and recovered.

In a preferred embodiment of the present invention an alkali metal salt of carboxymethyl cellulose is made by etherifying cellulose, in the presence of caustic alkali, with monochloroacetic acid or the alkali metal salts thereof. The reaction is conducted in a 3-component, 2-phase liquid reaction medium in which one liquid phase comprises a mixture of water and a water-miscible aliphatic alcohol having from 2 to 4 carbon atoms, and the second liquid phase comprises an aromatic hydrocarbon and an additional amount of said water-miscible aliphatic alcohol. The alkali cellulose is formed by treating the cellulose with aqueous alkali in said 3-component system at a temperature from about 15° to 40° C. for at least 10 minutes, the alcohol content of said total liquid phases being from about 30 to 40%, by weight, the weight ratio of water to alcohol being from about 0.15 to 0.24 during said etherification and the caustic-to-cellulose ratio before addition of the etherifying agent is from about 0.4 to 1.0, but never less than 2 moles of caustic per mole of etherifying agent used. The etherifying agent is added to said alkali cellulose at a temperature from about 15° to 45° C., and this temperature is maintained while mixing for at least 5 minutes, then maintaining a temperature at from about 45° to 70° C. until substantially complete consumption of the etherifying agent has occurred. From about 0.2 to 2.0 parts of water per part of cellulose is added to the reaction medium over a period from about 3 to 10 minutes, followed by deliquifying, drying and comminuting said alkali metal salt of carboxymethylcellulose.

Two types of CMC defined by rheology have been recognized in the past, and the present invention is applicable to both types. These have been termed thixotropic CMC and smooth CMC. A material is said to be thixotropic if its solutions possess structure which exhibits any one of the following phenomena:

(a) The breakdown of structure upon shearing increases continuously with increased shear rate, (b) The structure is rebuilt upon rest after previous exposure to shearing, (c) The breakdown of structure increases continuously with the time during which the material is rapidly agitated. In the case of CMC, this structure is apparently the result of failure to adequately etherify crystalline regions of cellulose. In solution, these ordered regions form gel centers capable of building gel particles sufficiently large to be visible to the naked eye in flowing solutions. Since a product may exhibit any one or all the above properties, the degree of thixotropy cannot be determined by a single measurement nor expressed by a single number. Further, the amount of structure is dependent upon the concentration of solution, the temperature, the previous history of the solution and so forth. Thus, measurements of thixotropy have to be closely standardized and are valid only in the pragmatic sense of relating to end use tests or solution appearance.

So-called smooth CMC, on the other hand, exhibits a very low degree of thixotropy in aqueous solution.

One measure of the degree of thixotropy applicable to high-viscosity materials, i.e., above about 500 centipoises in 1% solution, is the ratio of the viscosity in a 3% salt solution to viscosity in water (SVR). With high viscosity materials, this ratio is very sensitive to the degree of thixotropy. Thus a ratio of 0.9 or higher is obtained with smooth products whereas ratios as low as 0.01 or less are obtained with very thixotropic materials. With medium or low viscosity materials, i.e., those having measured values of viscosity lower than about 1000 centipoises in 2% solution, the measured values of the SVR do not correlate well with end use results or visual appearance and do not give an appropriate measure of thixotropy for these materials.

The dependence of viscosity on shear rate is also a measurement of thixotropy. This can be defined by high shear slope (HSS). This follows the equation $u = as^{-n}$ where $u$ = viscosity in centipoises, $s$ = the r.p.m. of the Brookfield viscometer, $n$ = a constant which corresponds to the value of the slope on a log $u$ versus log $s$ plot and $a$ is equal to a constant. For a Newtonian fluid $n$ has a value of 0. For CMC solutions, $n$ increases in magnitude with the degree of thixotropy. The value of $n$ of thixotropic material can be greatly increased by subjecting the solution to high shear and allowing it to rest before the measurements are taken. The value of $n$ obtained in this manner will be referred to as the HSS. Smooth materials have an HSS below about 0.30 for medium viscosity and 0.45 for high viscosity material.

In order to prepare smooth CMC, reaction conditions which provide the following effects are selected:

(1) Penetration and swelling of inter- and ultra-crystalline regions of the cellulose should be as uniform as possible during the steep period and the chloroacetic acid mixing period.

(2) Excessively high reaction rates should not prevail during etherification.

In order to attain these goals the following conditions are used:

The composition of the total liquid should be from about 30 to 46% alcohol with water-to-alcohol ratios of about 0.15 to 0.24. The alcohol is preferably ethanol and the liquid composition is preferably from 35 to 40% ethanol at a water-ethanol ratio of from 0.18 to 0.21.

The temperature for steeping of the cellulose with alkali should be from 15 to 40° C. for 10 to 50 minutes but preferably from 28 to 33° C. for 30 to 45 minutes. Because on a commercial scale heat is generated by the addition of chloroacetic acid (MCA) to the alkali cellulose the MCA mixing temperature will ordinarily be higher than the steep temperature. The alkali cellulose can be cooled, however, before addition of the MCA. The MCA should be added at a temperature from about 15° to 45° C., and preferably from 25° to 35° C. and mixed with alkali cellulose for from about 5 to 30 minutes in this temperature range. As the steep temperature is increased the allowable water/ethanol ratio range is decreased for obtaining products having optimum rheological properties.

The caustic-to-cellulose ratio should be from about 0.4 to 1, and preferably 0.5 to 0.7, but never less than 2 moles per mole of chloroacetic acid used. An increase in caustic permits smooth materials having optimum properties to be made over a wider range of liquid composition. For example, the maximum water-to-ethanol ratio can be increased from 0.23 to 25% excess caustic to 0.24 to 56% excess caustic.

The present process for densification of CMC gives a greater increase in density when the reaction conditions are such that smooth CMC is formed but application of the process to conditions which give thixotropic CMC does increase the density of the CMC to a very useful extent.

Any source of purified cellulose can be used in the process but wood pulp and linters are preferred. The size of the cellulose particles can vary widely, preferably the mesh size of the starting cellulose is greater than 10 mesh and more particularly from 20 to 100 mesh. Agitation of the reaction mixture becomes difficult with coarser cellulose and higher liquid solid ratios must be used in such cases, thus requiring a greater quantity of caustic. However, the coarser materials can be used provided the slurry can be adequately agitated. The total liquid to cellulose ratio should be such that the slurry can be easily agitated. In general, this ratio will be from about 4 to 1 to 20 to 1, and preferably, from about 9 to 1 to 15 to 1.

The water-immiscible liquid used in the etherification medium can be an inert hydrocarbon, for example an aliphatic hydrocarbon, aromatic hydrocarbon, substituted aliphatic hydrocarbon or substituted aromatic hydrocarbon boiling above about 35° C. Naturally, this liquid should not be attacked by caustic at etherification temperatures. A representative list of suitable water-immiscible inert liquid hydrocarbons include, for example, hexane, heptane, octane, diisobutylene, benzene, toluene, xylene, cumene, chlorobenzene, bromobenzene, and chloroprene. The liquid aromatic hydrocarbons boiling above about 50° C. are preferred. A representative list of suitable liquid aromatic hydrocarbons include, for example, ethylbenzene, cumene, and preferably benzene, toluene and xylenes and mixtures thereof.

Preferably the organic, water-miscible component of the liquid medium of the present invention is an aliphatic alcohol having from two to four carbon atoms and especially ethanol. The preference is based on the availability of these liquids, their relatively low cost, and the ease with which they can be removed and recovered from the product.

The water for densification is added to the etherification reaction medium at etherification temperatures, i.e., from about 40° to 75° C. over a period of from at least about 3 and usually not more than about 20 minutes. The CMC is then deliquified by filtration, centrifugation or other conventional means.

The water for densification is added to the etherification reaction medium after substantial completion of the etherification reaction, i.e., after more than about 90% of the carboxyalkylating agent, e.g., chloroacetic acid, has reacted with alkali cellulose. The time varies for this percentage of completion of reaction but generally ranges from about 20 minutes when the etherification temperature is 65° C., to about 50 minutes at 55° C., and 80 minutes when the etherification temperature is 45° C.

After deliquification the CMC can be purified by conventional means if desired. For practical purposes the CMC is dried and comminuted by conventional procedures, whether purified or not, because of excessive transportation costs for transporting the liquid.

The properties of the alkali salts of carboxymethyl cellulose prepared by the present process, such as color, viscosity and physical form can be modified at will by suitable modifications to the process, which, however, do not change the basic process. For example, hydrogen peroxide, or other oxidizing agents, can be added to the mixture either during or after etherification to bleach and lower the viscosity of the solutions of the resulting product.

In describing a carboxyalkyl cellulose ether and the processes used in preparing such ether, certain terms have been used throughout this description, these terms have the following accepted connotation:

Degree of etherification—D.E.—the actual degree of substitution obtained as determined by an analysis of the product, i.e., the average number of ether groups which have been introduced per anhydroglucose unit of the cellulose molecule;

Theoretical degree of etherification—T.D.E.—the number of mols of etherifying agent, added to the reaction mixture, per anhydroglucose unit;

Reaction efficiency—R.E.—the ratio of the actual degree of etherification to the theoretical degree of etherification, expressed as percent.

Thus:

$$R.E. = \frac{D.E.}{T.D.E.} \times 100$$

The theoretical degree of etherification thus indicates the molar ratio of the etherifying agent to the cellulose present in the reaction mixture, while the degree of etherification is used in classifying the ether with regard to solubility in water, aqueous alkali solutions, etc.

D.P.—degree of polymerization.
MCA—monochloroacetic acid.
Steep—process of stirring of cellulose with alkali in 3-component system before addition of etherifying agent.

When liquid compositions are identified by percentages the water includes that added with the cellulose, alcohol and caustic.

Excess caustic—the excess caustic is calculated as follows:

$$\text{Percent excess caustic} = \frac{100B - 200A}{A}$$

where A is moles MCA used and B is moles caustic used, or similarly to calculate moles of caustic used from the percent excess caustic the formula is $$B = 2A + \frac{\text{percent excess} \times A}{100}$$

The following examples should not be construed as limiting the invention but illustrating specific embodiments of the novel process, wherein ingredients are given as parts by weight.

As shown above, and in the examples hereinbelow, the etherification reaction is conducted in a 2-phase liquid reaction system. The aqueous phase comprises water and a water-miscible aliphatic alcohol, preferably having from two to four carbon atoms. The organic phase comprises said water-miscible aliphatic alcohol and an inert water-immiscible liquid hydrocarbon.

The first five examples show the manufacture of a purified grade CMC having a low viscosity.

Example 1

62.5 parts of 60 mesh purified wood pulp (600 D.P.) (4.2% moisture) are added to 278 parts of ethanol (92.4% by weight) and 361 parts of benzene in a mixer, and agitation commenced, 59.3 parts of aqueous caustic solution (53% NaOH) are added over a period of about one minute, and the mixture is steeped at a temperature of 30° C. for 30 minutes. 31.5 parts of solid monochloroacetic acid are then added at 35° C. and mixed for 10 minutes, and the reaction mixture is heated to 63° C. for a period of 40 minutes with constant agitation. 35% $H_2O_2$ (1.1 parts) is added and agitation continued for 20 minutes at 63° C. Water (60 parts) is then added over a ten minute period while agitating and maintaining the temperature at 63° C. The excess caustic is neutralized with glacial acetic acid.

The product is filtered, washed with aqueous ethanol, and dried. Upon analysis, the product thus obtained has a D.E. of 0.70. Based on a T.D.E. of 0.9 the reaction efficiency of the process is 78%. The solubility of the product in water is excellent, forming a clear solution, a 2% solution having a viscosity of 45 centipoises.

The density of the granular product is 0.79 g./cc.

A similar run in which no water was added for densification yielded a product having a density of only 0.60.

Examples 2 through 5

The procedure of Example 1 is followed exactly with the variables controlled as detailed in the table below.

| Run Number | 2 | 3 | 4 | 5 |
|---|---|---|---|---|
| Liquid/cell ratio | 11.25 | 11.25 | 11.25 | 11.25 |
| Type of cellulose | (1) | (1) | (1) | (1) |
| Slurry, percent $C_6H_6$ | 53.5 | 53.5 | 53.5 | 53.5 |
| Medium, percent EtOH | 38.0 | 38.0 | 38.0 | 38.0 |
| Medium, percent $H_2O$ | 8.5 | 8.5 | 8.5 | 8.5 |
| $H_2O$ added (g./g. cell.) | 0.667 | 0.333 | 0.833 | 1.0 |
| Point of $H_2O$ addn. (min. of reaction) | 60 | 60 | 60 | 60 |
| Addition period for densification $H_2O$ | 10 | 10 | 10 | 10 |
| 2% Viscosity | 41 | 91.4 | 36.4 | 39.5 |
| Percent NaCl | 1.27 | 0.97 | 1.35 | 1.46 |
| Density, g./cc | 0.73 | 0.67 | 0.79 | 0.81 |

[1] Wood pulp, 60 mesh. D.P.=600.
Fixed conditions: Scale—60 parts net cellulose; steep—30 min. at 30° C.; MCA mix—10 min. at 35° C.; reaction—70 min. at 63° C.; purification—washing with aqueous ethanol; drying—30 min. at 40° C., 2 hr. at 100° C.; TDE=0.9, percent excess caustic=36, 35% $H_2O_2$=1.1 parts added at 40 mm. of reaction.

The procedure of Example 1 is repeated substituting toluene for benzene. Similar results are obtained.

Examples 6 and 7

These examples show the preparation of a crude grade of CMC containing salts of reaction. The procedure of Example 1 is followed except that no hydrogen peroxide is added nor is the product washed. The variables are controlled as shown in the table below.

| Run Number | 6 | 7 |
|---|---|---|
| Liquid/cell. ratio | 11.25 | 11.25 |
| Type of cellulose | (1) | (1) |
| Slurry, percent $C_6H_6$ | 54 | 54 |
| Medium, percent EtOH | 38 | 38 |
| Medium, percent $H_2O$ | 8 | 8 |
| $H_2O$ added (g./g. cell.) | 0.333 | 0.5 |
| Point of $H_2O$ addn. (min. of reaction) | 60 | 60 |
| Addn. period for densification $H_2O$ | 10 | 10 |
| Aging time of filter cake (min.) | 5 | 5 |
| 2% viscosity | 160 | 160 |
| Density, g./cc | 0.72 | 0.76 |

[1] Wood pulp, 60 mesh. D.P.=600.
Fixed conditions: Scale—60 parts net cellulose; steep—30 min. at 30° C; MCA mix—10 min. at 35° C; reaction—70 min. at 63° C.; drying—30 min. at 40° C., 2 hr. at 100° C.; TDE—0.8, percent excess caustic=25.

Examples 8 through 11

These examples show the preparation of a purified grade of CMC of medium viscosity and smooth rheology. The procedure of Example 1 is used with the variables controlled as shown in the table below. No hydrogen peroxide is added.

| Run Number | 8 | 9 | 10 | 11 |
|---|---|---|---|---|
| Liquid/cell. ratio | 11.25 | 11.25 | 11.25 | 11.25 |
| Type of cellulose | (1) | (1) | (1) | (1) |
| Slurry, percent $C_6H_6$ | 53.7 | 53.7 | 53.7 | 53.7 |
| Medium, percent EtOH | 38.0 | 38.0 | 38.0 | 38.0 |
| Medium, percent $H_2O$ | 8.3 | 8.3 | 8.3 | 8.3 |
| $H_2O$ added (g/g cell.) | 1.0 | 0.667 | 1.083 | 0.917 |
| Point of $H_2O$ addn. (min. of reaction) | 60 | 60 | 60 | 60 |
| Addn. period for densification $H_2O$ | 10 | 10 | 10 | 10 |
| Aging time of filter cake (min.) | 10 | 10 | 10 | 10 |
| 2% viscosity | 580 | 825 | 435 | 488 |
| Density, g./cc | 0.73 | 0.68 | 0.79 | 0.73 |

[1] Wood pulp D.P.=600.
Fixed conditions: Scale—60 g. net cellulose; steep—30 min. at 30° C; MCA mix—10 min. at 35° C; reaction—70 min. at 63° C; purification—washing with aqueous ethanol; drying—30 min. at 40° C., 2 hr. at 100° C.; TDE=1, percent excess caustic=25.

Examples 12 through 18

These examples show the preparation of a purified grade of CMC having high viscosity and smooth rheology. The procedure is substantially the same as that used in Example 1, and the variables are controlled as shown in the table below. No hydrogen peroxide is added.

| Run Number | 12 | 13 | 14 | 15 | 16 | 17 | 18 |
|---|---|---|---|---|---|---|---|
| Liquid/cell. ratio | 11.25 | 11.25 | 11.25 | 11.25 | 11.25 | 11.25 | 11.25 |
| Type of cellulose | (1) | (1) | (1) | (1) | (1) | (1) | (1) |
| Slurry, percent $C_6H_6$ | 54.5 | 54.5 | 54.5 | 54.5 | 54.5 | 54.5 | 54.5 |
| Slurry, percent EtOH | 38.0 | 38.0 | 38.0 | 38.0 | 38.0 | 38.0 | 38.0 |
| Slurry, $H_2O$ | 7.5 | 7.5 | 7.5 | 7.5 | 7.5 | 7.5 | 7.5 |
| $H_2O$ added (g./g. cell.) | 1.0 | 1.33 | 2.0 | 2.5 | 2.5 | 3.0 | 2.0 |
| Point of $H_2O$ addn. (min. of reaction) | 70 | 70 | 70 | 70 | 70 | 70 | 70 |
| Addn. period for densification $H_2O$ | 10 | 10 | 10 | 10 | 10 | 10 | 10 |
| Aging time of filter cake | (2) | (2) | (2) | (2) | 10 | (2) | 15 |
| Density, g./cc | 0.64 | 0.67 | 0.70 | 0.75 | 0.86 | 0.78 | 0.82 |

[1] Wood pulp. D.P.=1800. [2] None.
Fixed conditions: Scale—60 parts net cellulose; steep—30 min. at 30° C.; MCA mix—10 min. at 35° C.; reaction—70 min. at 63° C.; purification—washing with aqueous ethanol; drying—30 min. at 40° C., 2 hr. at 100° C.; TDE=1, percent excess caustic=25.

Examples 19 through 22

These examples show the preparation of a purified grade of CMC having a low viscosity. The procedure is substantially the same as that described in Example 1, and the variables are controlled as shown in the table below.

| Run Number | 19 | 20 | 21 | 22 |
|---|---|---|---|---|
| Liquid/cell. ratio | 11.25 | 11.25 | 11.25 | 11.25 |
| Type of cellulose | (1) | (1) | (1) | (1) |
| Slurry, percent $C_6H_6$ | 53.5 | 53.5 | 53.5 | 53.5 |
| Medium, percent EtOH | 38.0 | 38.0 | 38.0 | 38.0 |
| Medium, percent $H_2O$ | 8.5 | 8.5 | 8.5 | 8.5 |
| $H_2O$ added (g./g. cell.) | 1.883 | 1.283 | 0.667 | 0.267 |
| Point of $H_2O$ addn. (min. of reaction) | 70 | 70 | 70 | 70 |
| Addn. period for densification $H_2O$ | 10 | 10 | 10 | 10 |
| Aging time of filter cake (min.) | 10 | 10 | 10 | 10 |
| 2 percent viscosity | 37.4 | 35.5 | 40.0 | 29.5 |
| Density, g./cc | 0.98 | 0.91 | 0.78 | 0.72 |

[1] Wood pulp. D.P.=600.
Fixed conditions: Scale—60 parts net cellulose; steep—30 min. at 30° C.; MCA mix—10 min. at 35° C.; reaction—70 min. at 63° C.; purification—washed with aqueous ethanol; drying—30 min. at 40° C., 2 hr. at 100° C.; TDE=1, percent excess caustic=25, $H_2O_2$=1.6 parts added at 40 min. of reaction.

Examples 23 through 26

These examples show the preparation of a purified grade of CMC having high viscosity and thixotropic rheology. The procedure of Example 1 is used and the variables are controlled as detailed in the table below. No hydrogen peroxide is used.

| Run Number | 23 | 24 | 25 | 26 |
|---|---|---|---|---|
| Liquid/cell. ratio | 11.25 | 11.25 | 11.25 | 11.25 |
| Type of cellulose | (1) | (1) | (1) | (1) |
| Slurry, percent $C_6H_6$ | 53 | 53 | 53 | 53 |
| Slurry, percent EtOH | 38 | 38 | 38 | 38 |
| Slurry, percent $H_2O$ | 9 | 9 | 9 | 9 |
| $H_2O$ added (g./g. cell.) | 1.67 | 1.0 | 2.333 | 3.0 |
| Point of $H_2O$ addn. (min. of reaction) | 60 | 60 | 60 | 60 |
| Addn. period for densification $H_2O$ | 10 | 10 | 10 | 10 |
| Aging time of filter cake (min.) | 5 | 5 | 5 | 5 |
| 1 percent viscosity | 2,088 | 2,216 | | |
| Density, g./cc | 0.72 | 0.64 | 0.72 | 0.74 |

[1] Wood pulp. D.P.=1560.
Standard conditions: Scale—60 parts net cellulose; steep—30 min. at 40° C.; MCA mix—none (MCA added at 56° C.); reaction—70 min. at 63° C.; purification—washing with aqueous ethanol; drying—30 min. at 40° C., 2 hr. at 100° C.; TDE=1, percent excess caustic=25 percent.

I claim:
1. A process for preparing dense, granular carboxymethyl cellulose which comprises etherifying alkali cellulose with chloroacetic acid in a 3-component, 2-phase liquid reaction medium in which one liquid phase comprises a mixture of water and a water-miscible aliphatic alcohol and the second liquid phase comprises an inert water-immiscible organic liquid hydrocarbon and an additional amount of said water-miscible aliphatic alcohol, the ratio of total liquid by weight in said reaction medium to dry cellulose being at least about 4:1, but not exceeding about 20:1, the ratio of water by weight in the water-alcohol phase to dry cellulose at the beginning of the reaction being in the range of about 0.03:1 to about 3.4:1, the total amount of said water-miscible aliphatic alcohol in the reaction medium constitutes at least about 7 percent by weight of the total weight of the liquid in the reaction mixture at the start of the reaction, and after substantial completion of etherification adding to the reaction medium from about 0.1 to 3 parts water per part cellulose for a period of at least about 3 minutes, and deliquifying the carboxymethyl cellulose.

2. The process of claim 1 wherein the water-miscible aliphatic alcohol contains from two to four carbon atoms.

3. The process of claim 1 wherein the water-miscible aliphatic alcohol is ethanol.

4. The process of claim 1 wherein the inert water-immiscible liquid hydrocarbon is aromatic.

5. The process of claim 1 wherein the inert water-immiscible liquid hydrocarbon is benzene.

6. The process of claim 1 wherein the inert water-immiscible liquid hydrocarbon is toluene.

7. The process of claim 1 wherein the water is added to the ether for a period of from about 3 to 20 minutes.

8. The process of claim 7 wherein 0.2 to 2 parts water per part of cellulose is added.

9. A process for preparing a dense, grannular alkali metal salt of carboxymethyl cellulose which comprises etherifying alkali cellulose with chloroacetic acid in a 3-phase, 2-component liquid reaction medium in which one liquid phase comprises a mixture of water and ethanol and the second liquid phase comprises benzene and ethanol, the ratio of the total liquid by weight in said reaction medium to dry cellulose being at least about 4:1, but not exceeding about 20:1, the ratio of water by weight in the water-alcohol phase to dry cellulose at the beginning of the reaction being in the range of about 0.03:1 to 3.4:1, the total amount of ethanol in the reaction medium constitutes at least about 7 percent by weight of the total weight of the liquid in the reaction mixture at the start of the reaction, and after substantial completion of etherification adding to the reaction medium from about 0.1 to 3 parts water per part cellulose over a period of from about 3 to 20 minutes and deliquifying the carboxymethyl cellulose.

10. A process for the manufacture of dense, granular alkali metal salts of carboxymethyl cellulose which comprises etherifying cellulose in the presence of caustic alkali with a compound selected from the group consisting of monochloroacetic acid and the alkali metal salts thereof in a 3-component, 2-liquid phase reaction medium in which one phase comprises a mixture of water and a water-miscible aliphatic alcohol having from 2 to 4 carbon atoms, the second liquid phase comprises a liquid aromatic hydrocarbon and an additional amount of said water-miscible alcohol, the alcohol content of said total liquid phases being from about 30% to 46%, the weight ratio of water-to-alcohol being from about 0.15 to 0.24 during said etherification, and the caustic-to-cellulose ratio before addition of the etherifying agent is from about 0.4 to 1 but never less than 2 moles of caustic per mole of etherifying agent added, wherein the alkali cellulose is formed by treating the cellulose with aqueous alkali in said 3-component system at a temperature about from 15° to 45° C. for at least 10 minutes, adding said etherifying agent to said alkali cellulose at a temperature from about 15° to 45° C., maintaining this temperature while mixing for from about 5 minutes to 30 minutes, then raising the temperature to from about 40° to 75° C. until substantially complete consumption of the etherifying agent has occurred, adding from about 0.1 to 3.0 parts of water per part of cellulose over a period of from about 3 to 20 minutes, and deliquifying said alkali metal salt.

11. The process of claim 10 wherein the water-miscible alcohol is ethanol.

12. The process of claim 10 wherein the aromatic hydrocarbon is benzene.

13. The process of claim 10 wherein the aromatic hydrocarbon is toluene.

14. The process of claim 10 wherein the caustic is sodium hydroxide.

15. The process of claim 10 wherein the deliquified alkali metal salt is dried and comminuted.

References Cited

UNITED STATES PATENTS

| 2,976,278 | 3/1961  | Paddison et al. | 260—231 |
| 2,912,431 | 11/1959 | Leonard et al.  | 260—232 |
| 2,839,526 | 6/1958  | Miller          | 260—232 |
| 2,715,124 | 8/1955  | Miller          | 260—232 |
| 2,618,018 | 11/1952 | Downing et al.  | 260—232 |
| 2,607,772 | 8/1952  | Rigby           | 260—232 |

FOREIGN PATENTS 781,209   8/1957   Great Britain.

DONALD E. CZAJA, *Primary Examiner.*

R. W. MULCAHY, *Assistant Examiner.*